(12) United States Patent
Pabon et al.

(10) Patent No.: US 8,256,565 B2
(45) Date of Patent: Sep. 4, 2012

(54) ENCLOSURES FOR CONTAINING TRANSDUCERS AND ELECTRONICS ON A DOWNHOLE TOOL

(75) Inventors: Miguel F. Pabon, Sugar Land, TX (US); Fernando Garcia Osuna, Sugar Land, TX (US); David B. Ayers, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 373 days.

(21) Appl. No.: 11/379,134

(22) Filed: Apr. 18, 2006

(65) Prior Publication Data
US 2006/0254767 A1     Nov. 16, 2006

Related U.S. Application Data

(60) Provisional application No. 60/594,830, filed on May 10, 2005.

(51) Int. Cl.
*G01V 1/00* (2006.01)
*G01V 1/40* (2006.01)
*E21B 47/00* (2012.01)

(52) U.S. Cl. ........ 181/104; 181/102; 181/108; 181/110; 181/111; 181/112; 166/254.2; 166/255.2; 367/27; 367/35; 175/50

(58) Field of Classification Search .................. 181/104, 181/108, 110, 111, 112, 102; 166/254.2, 166/255.2; 367/35, 27
See application file for complete search history.

(56) References Cited

U.S. PATENT DOCUMENTS

| | | | | |
|---|---|---|---|---|
| 3,184,965 | A | * | 5/1965 | Noik .......................... 73/152.51 |
| 3,213,415 | A | * | 10/1965 | Baker et al. .................... 181/106 |
| 3,401,772 | A | * | 9/1968 | Kokesh ............................ 367/35 |
| 3,542,150 | A |   | 11/1970 | Youmans et al. |
| 4,219,095 | A |   | 8/1980 | Trouiller |
| 4,658,897 | A |   | 4/1987 | Kompanek et al. |
| 4,757,873 | A | * | 7/1988 | Linyaev et al. ............... 181/105 |
| 4,805,156 | A | * | 2/1989 | Attali et al. ...................... 367/35 |
| 4,881,208 | A | * | 11/1989 | Liu .................................. 367/35 |
| 4,928,031 | A | * | 5/1990 | Linyaev et al. ............... 310/346 |
| 5,477,101 | A |   | 12/1995 | Ounadjela |
| 5,509,303 | A | * | 4/1996 | Georgi ........................ 73/152.18 |
| 5,644,186 | A | * | 7/1997 | Birchak et al. ................ 310/337 |
| 5,763,773 | A | * | 6/1998 | Birchak et al. ............. 73/152.58 |
| 5,907,099 | A |   | 5/1999 | Huang et al. |
| 6,084,052 | A |   | 7/2000 | Aufdermarsh et al. |
| 6,173,793 | B1 |   | 1/2001 | Thompson et al. |
| 6,179,066 | B1 |   | 1/2001 | Nasr et al. |
| 6,213,250 | B1 |   | 4/2001 | Wisniewski et al. |

(Continued)

FOREIGN PATENT DOCUMENTS

EP     0837217 B1     11/2003

(Continued)

*Primary Examiner* — David Warren
*Assistant Examiner* — Christina Russell
(74) *Attorney, Agent, or Firm* — Jianguang Du; Brigitte Jeffery Echols

(57) ABSTRACT

An enclosure for housing a transducer and electronics for disposal on a downhole tool. A transducer is disposed at an angle with respect to a longitudinal axis of the enclosure, wherein the enclosure contains a fluid surrounding the transducer. Enclosures also include transducers linked to motor means for selective rotation of the transducers within the enclosure. Enclosures with transducer arrays for phased or targeted signal transmission/detection.

21 Claims, 5 Drawing Sheets

U.S. PATENT DOCUMENTS

| | | | |
|---|---|---|---|
| 6,281,489 B1* | 8/2001 | Tubel et al. | 250/227.14 |
| 6,300,762 B1 | 10/2001 | Thomas, Jr. et al. | |
| 6,466,513 B1 | 10/2002 | Pabon et al. | |
| 6,483,777 B1* | 11/2002 | Zeroug | 367/35 |
| 6,540,021 B1* | 4/2003 | Botrel | 166/250.08 |
| 6,564,883 B2 | 5/2003 | Fredericks et al. | |
| 6,671,380 B2 | 12/2003 | Chang et al. | |
| 6,710,600 B1 | 3/2004 | Kopecki et al. | |
| 6,928,202 B2 | 8/2005 | Pickrell et al. | |
| 6,957,708 B2* | 10/2005 | Chemali et al. | 175/50 |
| 7,150,317 B2* | 12/2006 | Barolak et al. | 166/254.2 |
| 7,364,007 B2* | 4/2008 | Garcia-Osuna et al. | 181/108 |
| 7,380,466 B2* | 6/2008 | Deeg | 73/803 |
| 7,418,865 B2* | 9/2008 | Griffiths et al. | 73/597 |
| 7,525,872 B2* | 4/2009 | Tang et al. | 367/35 |
| 2002/0108784 A1 | 8/2002 | Kruspe et al. | |
| 2005/0001624 A1 | 1/2005 | Ritter et al. | |
| 2005/0056415 A1* | 3/2005 | Zillinger | 166/66 |
| 2005/0150713 A1* | 7/2005 | Garcia-Osuna et al. | 181/108 |
| 2005/0205268 A1* | 9/2005 | Engels et al. | 166/381 |
| 2006/0225523 A1* | 10/2006 | Reddy et al. | 73/865.6 |
| 2008/0047753 A1* | 2/2008 | Hall et al. | 175/57 |
| 2009/0173541 A1* | 7/2009 | Tulloch et al. | 175/45 |

FOREIGN PATENT DOCUMENTS

GB 2275337 8/1994

* cited by examiner

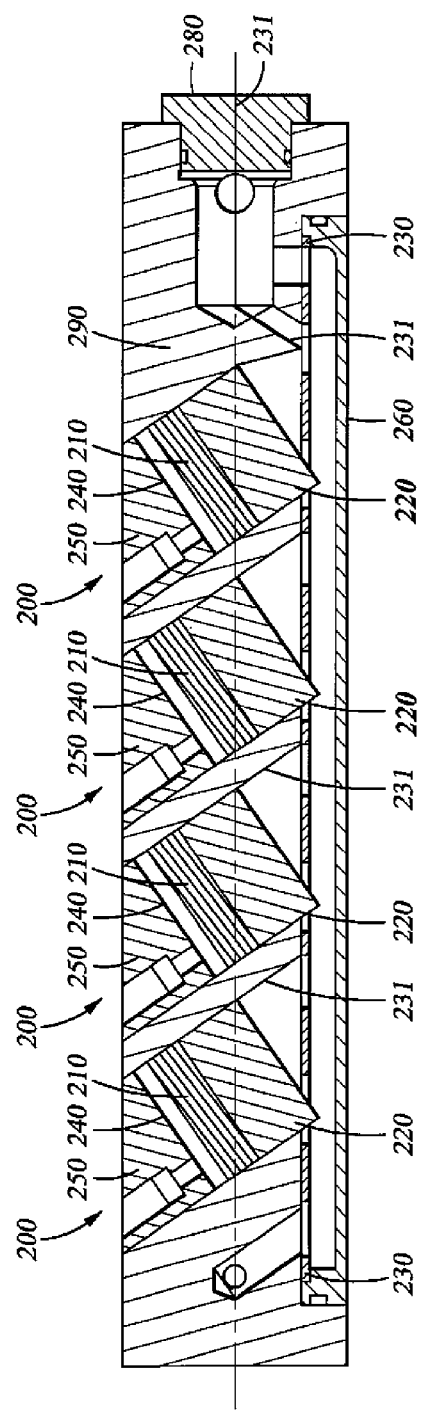
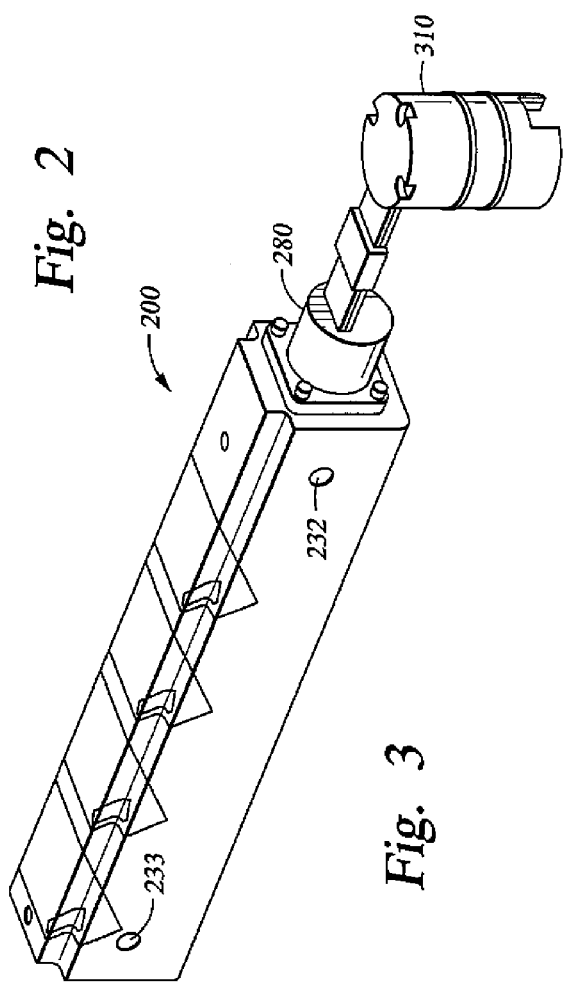
Fig. 2
Fig. 3

ENCLOSURES FOR CONTAINING TRANSDUCERS AND ELECTRONICS ON A DOWNHOLE TOOL

CROSS-REFERENCE TO RELATED APPLICATIONS

This application claims benefit of U.S. provisional application Ser. No. 60/594,830, filed May 10, 2005, which is herein incorporated by reference.

BACKGROUND

1. Field of the Invention

Implementations of various technologies described herein generally relate to the packaging or housing of various sources, sensors and electronics for use inside a wellbore.

2. Description of the Related Art

The methodology of housing or packaging sources, sensors, electronics, and general components has seen many changes as technologies and materials have improved over time. In the oil and gas industry, subsurface formations are typically probed by well logging instruments to determine the formation characteristics. Data is typically acquired using sources and sensors disposed on a downhole tool and either stored in downhole memory or transmitted to the surface. As used herein, the term "transducers" is understood to encompass devices capable of operation as sources and/or sensors, and is not to be limited to any one particular signal type (i.e., acoustic, gravity, electromagnetic, pressure, etc.).

In conventional logging operations, particularly in wireline applications, the transducers are often placed on the downhole tool such that they are exposed to the subsurface environment. In some implementations the transducers are mounted within a tool housing filled with a fluid, such as oil. A drawback with this methodology is that such implementations may require volume compensation for the oil. Such mechanisms often entail pistons or bellows that move in response to displacement of the oil as a result of pressure and temperature changes, which. Further, certain compensating components exposed to the downhole environment may need to be cleaned in between downhole trips to ensure that they function properly. Such mechanisms often entail pistons or bellows that move in response to displacement of the oil as a result of pressure and temperature changes, which then affects the mechanical complexity of the system.

However, in logging while drilling (LWD) or measuring while drilling (MWD) applications, the above methodology is not particularly suitable or reliable due to the harsh drilling environment, which may be characterized by high shock condition, high pressures and high temperatures. Consequently, the transducers and associated electronics are typically disposed inside the drill string and are thereby isolated from the harsh drilling environment, which is detrimental to their ability to serve their intended purposes.

A need remains for improved techniques to package and house transducers and electronics for subsurface use.

SUMMARY OF THE INVENTION

The invention provides an enclosure for disposal on a downhole tool. The enclosure comprises at least one transducer disposed at an angle with respect to a longitudinal axis of the enclosure: and an electronics board coupled to the at least one transducer, wherein the enclosure contains a fluid surrounding the at least one transducer.

The invention provides a downhole tool for subsurface disposal. The tool comprising an elongated support: an enclosure disposed on the support, the enclosure comprising: at least one transducer disposed at an angle with respect to a longitudinal axis of the enclosure; and an electronics board coupled to the at least one transducer; wherein the enclosure contains a fluid surrounding the at least one transducer.

The invention provides a method for packaging a transducer for subsurface disposal. The method comprises disposing the transducer within an enclosure at an angle with respect to a longitudinal axis of the enclosure, disposing an electronics board within the enclosure, coupling the electronics board to the transducer; and filling the enclosure with a fluid to surround the transducer.

BRIEF DESCRIPTION OF THE DRAWINGS

FIG. 2 illustrates an enclosure in accord with the invention.

FIG. 3 illustrates a perspective view of the enclosure shown in FIG. 2.

DETAILED DESCRIPTION

Figure 1:
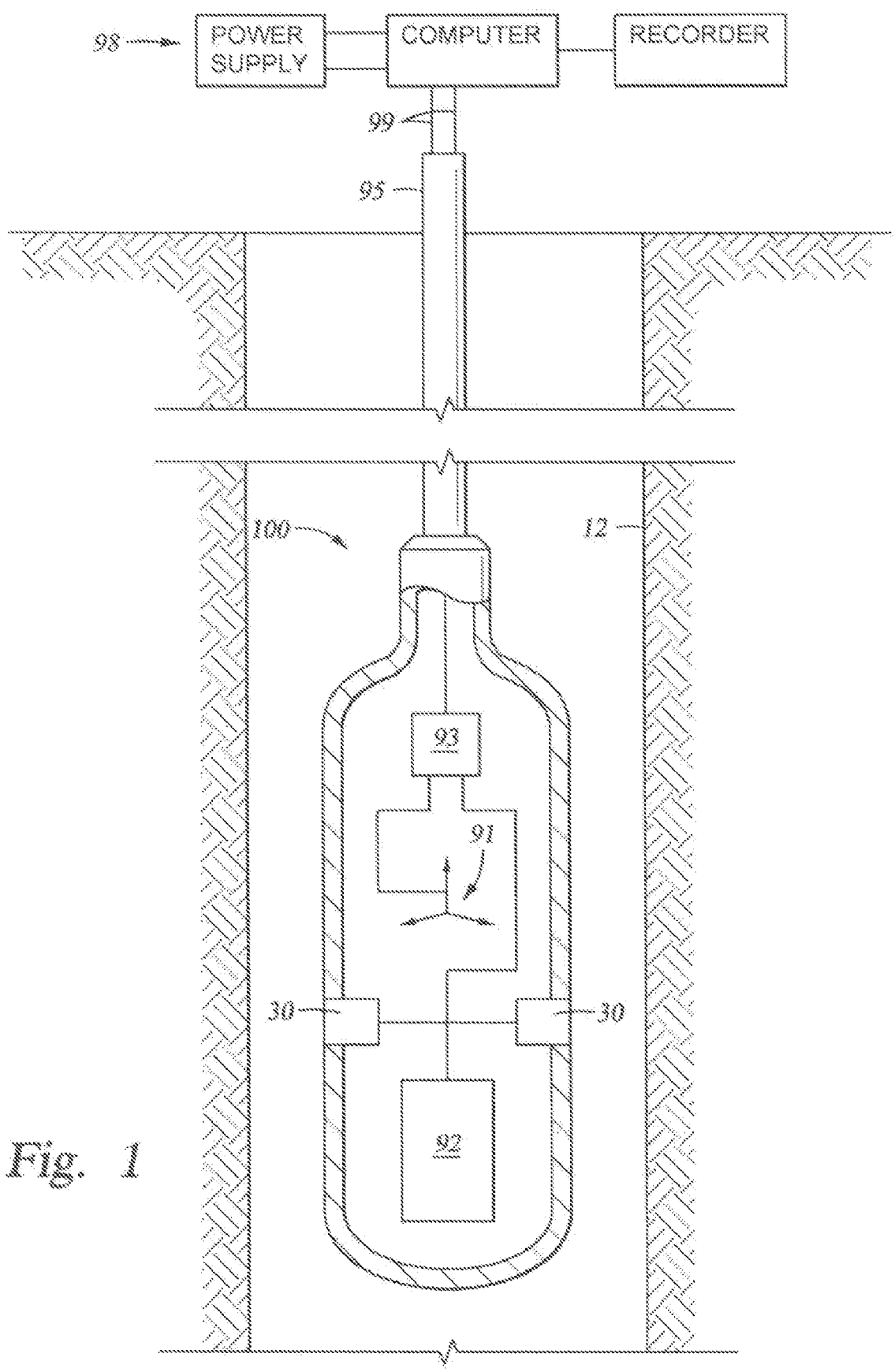
FIG. 1 illustrates a downhole tool equipped with enclosures for containing transducers and electronics in accord with the invention.

FIG. 1 illustrates a downhole tool 100 equipped with two enclosures 30, each containing transducers and electronics in accordance with implementations of various technologies described herein. Although two enclosures 30 are illustrated in the figure, it should be understood that in some implementations more or less than two enclosures may be used. The tool 100 is shown disposed in a borehole 12 that penetrates an earth formation. The enclosures 30 may be disposed on the outside surface of the downhole tool 100, which may be a drill collar, a wireline tool, casing, or any other oilfield equipment that may be deployed inside the borehole 12. The enclosure may be made from metal, plastic (e.g., polyetheretherketone PEEK® from Victrex Manufacturing Limited of Lancashire, Great Britain), or any other suitable material. Preferred materials should be strong enough to withstand the high pressures and high temperatures encountered downhole and should allow for the passage or radiation of a signal (e.g., electromagnetic, acoustic, etc.) therethrough.

The downhole tool 100 includes a multi-axial electromagnetic antenna 91 for subsurface measurements and various electronics 92, 93 with appropriate circuitry. Other embodiments of the invention may be implemented incorporating only the enclosures 30, without additional sources or sensors.

The downhole tool 100 may be supported in the borehole 12 by a logging cable 95 for a wireline application or a drill string 95 for a while-drilling application. In a wireline application, the tool 100 may be raised and lowered in the borehole 12 by a winch which may be controlled by an assembly of surface equipment 98, which may include a power supply, a recorder for recording the data and a computer for processing the data. The logging cable or drill string 95 may include conductors 99 that connect the downhole electronics 92, 93 with the surface equipment 98 for signal and control communication. The downhole electronics 92, 93 may include a source of electrical energy and downhole memory for storing signals as a function of time or depth. The downhole electronics 92, 93 may also interface with a telemetry module for transmitting measurement information to the surface in real time while drilling. Alternatively, the signals may be processed or recorded in the downhole tool 100 and the processed data may be transmitted to the surface equipment 98.

The enclosures 30 may be disposed on the outside surface, or in a cavity or void, of the downhole tool 100 by any attachment techniques commonly known in the industry. For example, depending on the subsurface application, the enclosure can be affixed to the tool exterior using a suitable adhesive, retainer, fasteners and the like, or on an arm extending from the tool 100 (not shown). The enclosures 30 may be disposed on the tool 100 such that only a fraction or surface of the enclosure is exposed to the borehole 12 as desired. This can be accomplished by disposing the enclosures 30 in a cavity or void formed in the tool 100. As shown in FIG. 1, only one surface of the enclosure is exposed to the borehole 12. The implementation of FIG. 1 shows the enclosures 30 linked to the multi-axial electromagnetic antenna 91 and/or various electronics 92, 93 by conventional communication means, such as cables, fiber optics, inductive couplings, or connectors.

FIG. 2 illustrates an enclosure 200 in accordance with implementations of various technologies described herein. The enclosure 200 may include a single transducer 210 or an array of transducers 210. In one implementation, the transducers 210 may be acoustic transducers. As such, the transducers 210 may be configured to convert energy between electric and acoustic forms and may be adapted to act as a source or a sensor, or both. One skilled in the art will appreciate that other forms of transducers may be used in implementations of the invention (e.g. resistivity electrodes, pressure, gravity, light, and other source/sensor devices).

Sonic logging of earth formations entails lowering an acoustic logging instrument or tool (such as tool 100) into a borehole traversing the formation. The instrument typically includes one or more acoustic sources (i.e., a transmitter) for emitting acoustic energy into the subsurface formations and one or more acoustic sensors or receivers for receiving acoustic energy. The transmitter is periodically actuated to emit pulses of acoustic energy into the borehole, which travel through the borehole and into the formation. After propagating through the borehole and formation, some of the acoustic energy travels to the receivers, where it is detected. Various attributes of the detected acoustic energy are subsequently related to subsurface or tool properties of interest.

When implemented with acoustic transducers, the enclosures 200 of the invention can be used for sonic logging to provide valuable information regarding subsurface acoustic properties, which can be used to produce images or derive related subsurface characteristics. Acoustic waves are periodic vibrational disturbances resulting from acoustic energy that propagates through a medium, such as borehole fluid and subsurface formations. Acoustic waves are typically characterized in terms of their frequency, amplitude, phase, energy, shape, and speed of propagation. Subsurface acoustic properties of interest include compressional wave speed, shear wave speed, borehole modes, and formation slowness. Additionally, acoustic images may be used to depict borehole wall conditions and other geological features away from the borehole. These acoustic measurements have applications in seismic correlation, petrophysics, rock mechanics and other parameters related to water and hydrocarbon exploration.

Turning to FIG. 2, although only four transducers 210 are shown, it should be understood that any number of transducers may be used in implementations of the various technologies described herein. The transducers 210 may be made of any suitable materials known in the art, such as piezoelectric ceramic discs. The composition, shape and frequency properties of the transducers may vary depending on the particular application. In one implementation, each transducer 210 is made from lead metaniobate powder mix compressed and baked to form a ceramic disc of about 1 inch (2.54 cm) in diameter and with a natural resonance frequency of about 250 kHz.

The transducers 210 may be disposed on the enclosure 200 at an angle ranging from a few degrees to about 90 degrees from the longitudinal axis of the enclosure 200, as shown in FIG. 2. The transducers 210 may also be closely spaced from each other within the enclosure 200.

A backing element 220 may be coupled to the back surface of each transducer 210. The backing element 220 may be formed in a similar shape to match the transducer 210, for example in cylindrical shape if the transducer is disc shaped. The backing element 220 may be formed from any suitable material, such as rubber compounds and other known synthetic resins or mixtures, depending on the type of transducer used in a particular implementation. In an implementation using acoustic transducers, the backing element 220 can be made from conductive material. In the case of a transducer 210 activated as a receiver, the backing element 220 may act as an attenuator to decrease the ringing of the transducer 210 after it has been struck by an incoming sound wave. In some implementations, the backing element 220 may be configured to increase the bandwidth response of the transducer 210. In some implementation, the backing element 220 may be replaced by an active, driven means of providing the attenuation (not shown).

The transducers 210 may be electrically coupled to an electronic board 230 (e.g. via wires 231), such as a printed circuit board (PCB), disposed adjacent the backing elements 220. The electronic board 230 may provide amplification, filtering, digitization and may interface with other electronic circuits, such as electronics 92, 93, which may be remotely disposed inside the downhole tool 100. The electronic board 230 may include control and processing circuitry, memory, and stored logic for emitting ultrasonic pulses via the transducers 210 and for generating return signals representative of echoes that return to the transducers 210 that interact with and return from the borehole wall. As a result of placing the electronic board 230 near the transducers 210, crosstalk between the transducers 210 and the electronic board 230 may be minimized, and interference with other circuits, such as power lines, may be reduced, thereby increasing the signal-to-noise ratio and reducing the amount of noise the measurement module may pick up from the other circuits. Signal communication to/from the electronic board 230 within the enclosure 200 and external devices in through a connector 280. In some implementations, a bulkhead 310 (shown in FIG. 3) may be used for connection with other circuits, e.g., electronics 92, 93. The bulkhead 310 may be a pressure-proof multi pin bulkhead connector as known in the art. FIG. 3 illustrates a perspective view of the enclosure 200 in accordance with implementations of various technologies described herein.

In one implementation, one side of the enclosure 200 facing the transducers 210 is formed including grooves or gaps 240 having a triangular cross section, as shown in FIG. 2. In some implementations, a wedge 250 may be disposed inside each groove 240 using an adhesive or any other attachment means commonly known in the art. The wedge 250 may be made form any suitable material that provides the desired signal transparency/properties. In one implementation, the wedge 250 may be made from polytetrafluoroethylene (PTFE) Teflon® from E.I. DuPont De Nemours & Co of Wilmington, Del., USA. As shown in the implementation of FIG. 2, the wedge 250 is exposed to the exterior and may provide an optimal interface with well fluids for an acoustic transducer, given its sound velocity characteristics. As such, the wedge 250 may be used to maintain the linearity of the angle of incidence of acoustic waves entering the transducers 210.

The enclosure 200 may further include a cover or lid 260 disposed on the opposite side of the grooves 240. The lid 260 may include an O-ring seal that acts simply as a fluid barrier. In one implementation, the lid 260 may be made from the same material as the rest of the enclosure 200, such as polyetheretherketone PEEK®. Implementation of the enclosure 200 may be formed in more than one piece (e.g. two halves) configured to fit together to form a closed unit. FIG. 2 shows one implementation having a main body and a lid 260 with an O-ring to provide a sealed enclosure 200.

The assembled enclosure 200 may further include a fluid 290, such as a polymerized fluid, within its internal cavity to fill the voids and surround the various components such as the transducers 210, backing elements 220, and the electronic board 230. The added fluid 290 aids in insulating the housed components from temperature extremes, from high pressures, in insulating conductors from one another, and in reducing shock to the components. In one implementation, the fluid 290 may be injected into the enclosure 200 after the lid 260 is affixed in place. In this case, a vacuum can be drawn from the enclosure 200 via a first valve 232 formed in the enclosure, while the fluid is injected via a second valve 233 in the enclosure (See FIG. 3). Once filled, the valves 232, 233 can be sealed using oil-filling plugs or other means known in the art. In some implementations, the lid 260 for the enclosure 200 also acts as a compensator for volume changes in the fluid 290 due to temperature/pressure variations. The large surface area (relative to the walls of the enclosure), thinness, and flexibility of the lid 260 allow it to flex as the fluid volume changes. As shown in the cross-section of FIG. 2 a lid 260 of the invention can be implemented with a thin recessed central section and a thicker perimeter to hold an O-ring to provide a seal. Other volume compensating means can be implemented with the enclosures of the invention as known in the art.

In one implementation, a polymerized gel is used as the filler fluid 290. Suitable fluids include a silicon-based gel, such as Sylgard® 182 available from Dow Coming of Midland, Mich., USA. Subsurface temperatures and pressures may affect the fluid 290 volume within the enclosure 200. In some implementations, the enclosure 200 may further include compensating means as known in the art to compensate for the volume changes of the polymerized gel 290 without adversely affecting the housed components.

Figure 4:
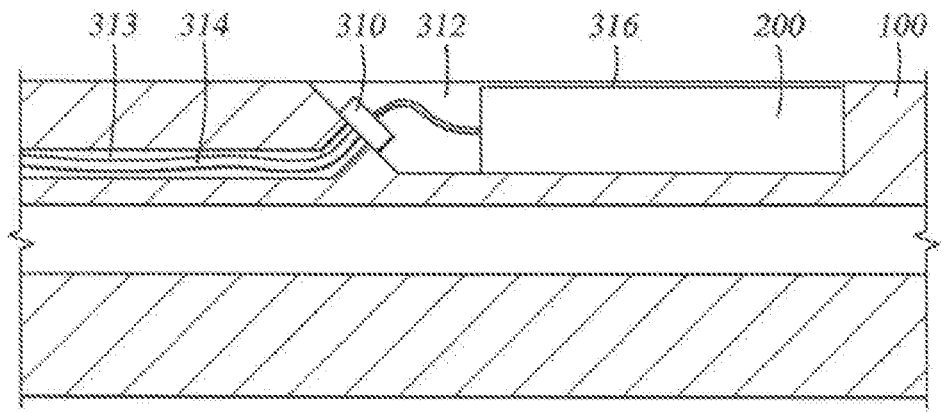
FIG. 4 is a cross-section side view of an enclosure disposed in a downhole tubular in accord with the invention.

The compact design and small component dimensions of the enclosures 200 of the invention allow one to construct a transducer unit that is smaller compared to conventional transducer packages. As such, the enclosures of the invention can be disposed on downhole tools in various ways. FIG. 4 shows a side view of an enclosure 200 of the invention disposed in a downhole tool 100. The enclosure 200 is in a recess 312 formed in the tool 100 wall. The enclosure 200 is coupled to a bulkhead 310 that ties into a passage 313, also referred to as a feedthrough, for signal/power transmission between the transducers 210 and external components (e.g., electronics, telemetry, memory, etc.) via one or more leads 314 as known in the art. A shield 316 may be used to cover the enclosure as described below.

Figure 5:
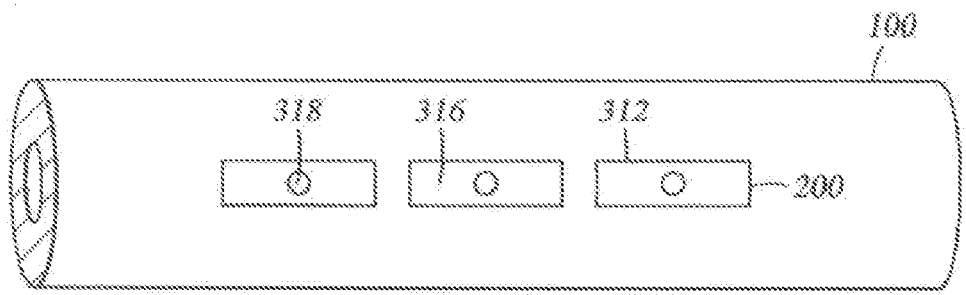
FIG. 5 shows a perspective view of a downhole tubular configured with enclosures and shields in accord the invention.

FIG. 5 shows a series of enclosures 200 disposed in a downhole tool 100. Each enclosure 200 is disposed in a separate recess 312 formed substantially parallel to the longitudinal axis of the tool 100. As mentioned above, shields 316 can be placed over the enclosures 200 for protection against abrasion and collision. The shields 316 may be formed of any suitable material and are preferably configured with one or more apertures 318. The shields 316 can be affixed to the downhole tool 100 using any suitable means as known in the art. Another implementation can be configured with a plurality of enclosures 200 disposed in one elongated recess or void formed in the tool 100 wall (not shown).

Figure 6:
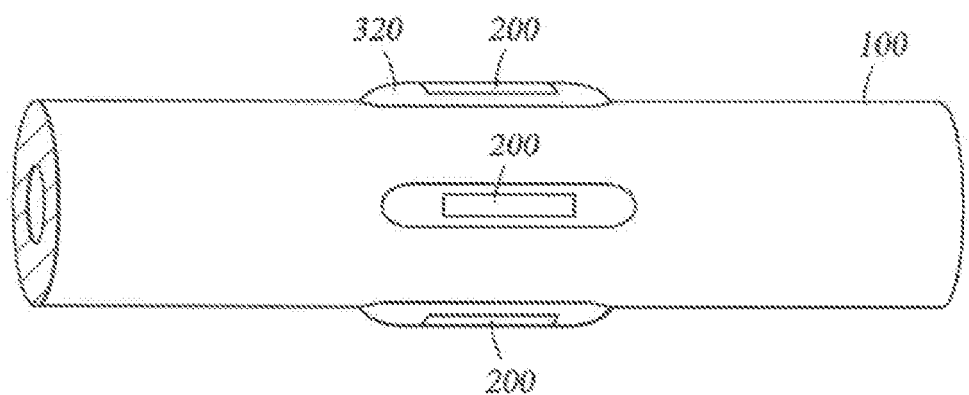
FIG. 6 shows a perspective view of another downhole tubular configured with enclosures in accord with the invention.

FIG. 6 shows another implementation of the invention. The enclosures 200 are shown disposed in a downhole tool 100 equipped with stabilizer blades 320. With this embodiment, the transducers 210 within the enclosures 200 can be maintained in direct contact with the borehole wall for more accurate measurements. Those skilled in the art will appreciate that the enclosures 200 of the invention can be disposed on downhole tools in many ways depending on the desired measurements and mode of tool conveyance within a borehole. For example, an enclosure 200 can be affixed to casing tubulars (inside or outside) using conventional fasteners or clamping means and linked by cable(s) for power/communication for long-term monitoring applications.

Figure 7:
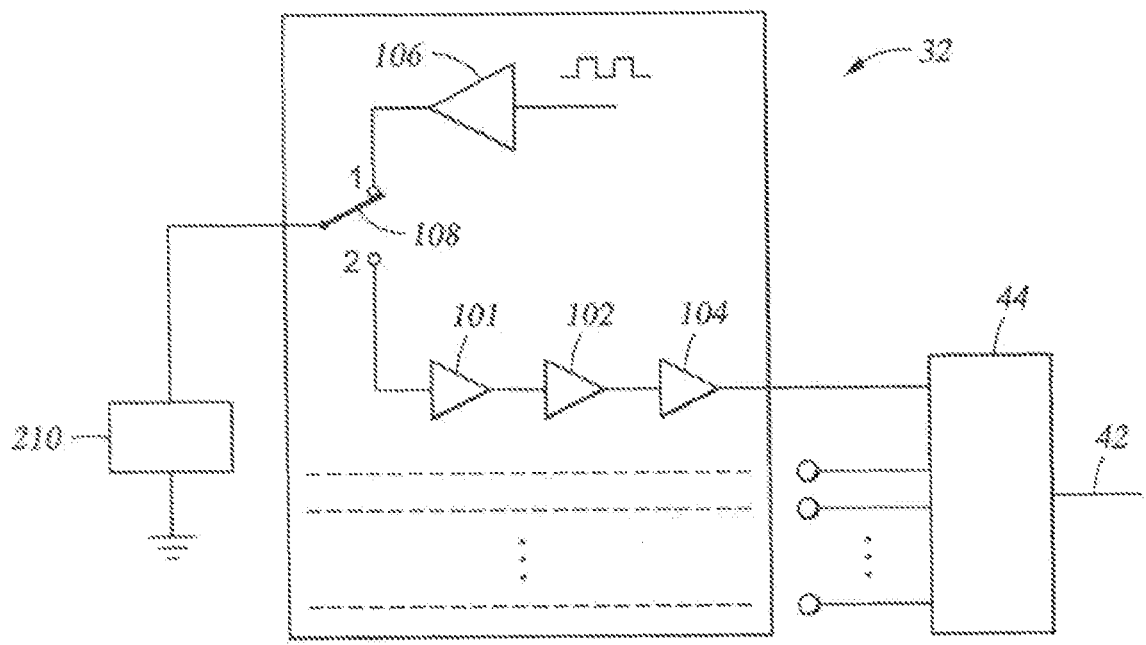
FIG. 7 is a schematic of a transducer electronics module and multiplexer module in accord with the invention.

FIG. 7 shows a general schematic layout of an electronics module 32 that can be implemented in an electronic board 230 of the enclosures of the invention. The module 32 includes a preamplifier stage 101, a filter stage 102, an analog-digital converter (ADC) stage 104, and a power amplifier stage 106. The module 32 is shown linked to an n-to-1 multiplexer (MUX) unit 44 adapted to funnel "n" signals to one channel for output through lead 42. A switch 108 linked to the transducer element 210 toggles between position 1 and position 2. In position 1, the transducer 210 is activated by the power amplifier stage 106 and the transducer is implemented as a transmitter. With the switch 108 in position 2, the preamplifier stage 101 receives the analog acoustic energy signal detected by the element 210 and it is processed through the module 32 to implement a receiver. The small package and low power electronics module 32 integrated with the transducer 210 minimizes power consumption and improves noise reduction since digital signals are cleaner compared to analog signals. The digitized signal data can also be routed far distances for additional processing free of unwanted noise if desired.

Figure 8:
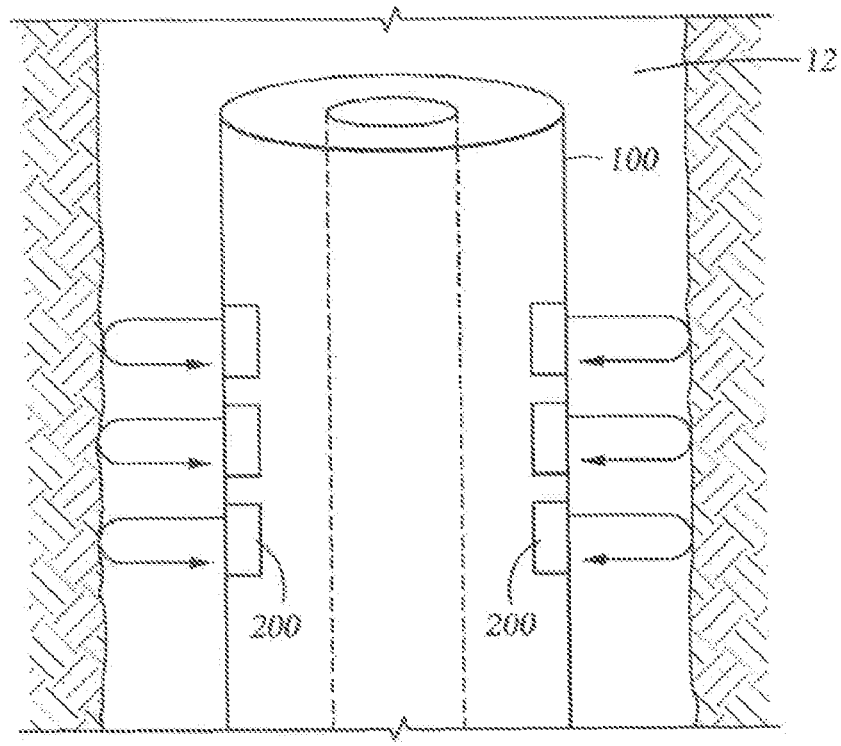
FIG. 8 shows a downhole tubular equipped with the acoustic transducers of the invention.

The dual-purpose transducers (i.e., source-sensor) 210 of the invention allow for pulse echo measurements. As known in the art, the measurement of two-way travel time of a pulse echo signal reflected from the borehole 12 wall can be used to determine the borehole geometry, such as its radius or standoff. FIG. 8 shows an implementation of the invention operating in a pulse echo mode. A downhole tool 100 is equipped with several axially and azimuthally distributed enclosures 200 of the invention. Using an electronic module 32, the transducer(s) 210 within the enclosures 200 can be switched between modes to obtain the pulse echo measurements in the borehole 12. The measured acoustic signal data can be processed using conventional techniques known in the art.

Figure 9:
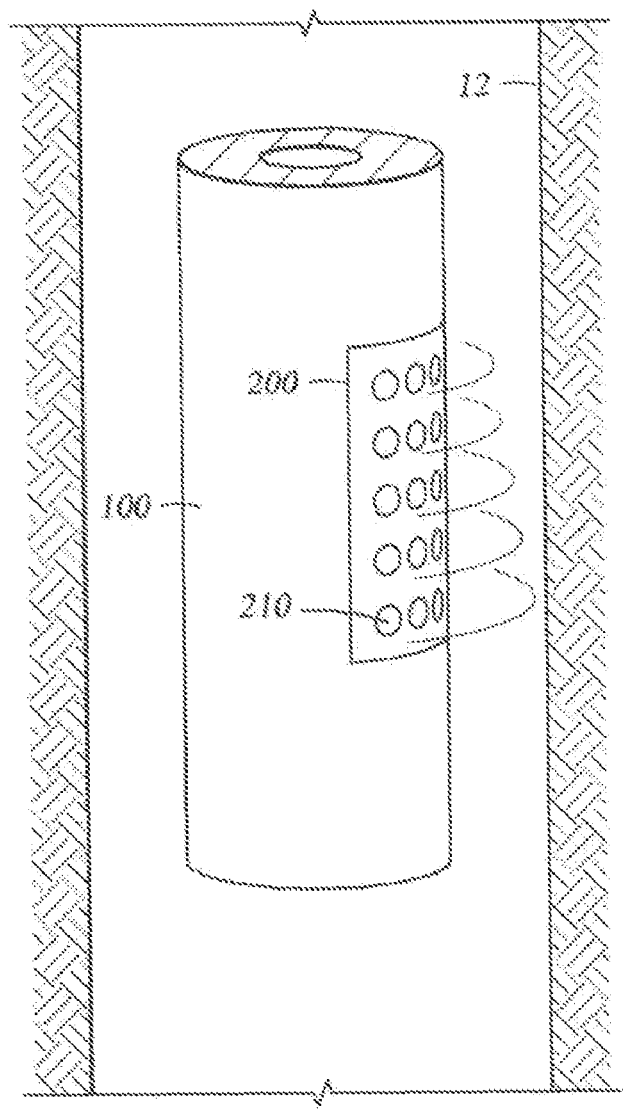
FIG. 9 illustrates a downhole tool equipped with enclosures containing an array of transducers in accord with the invention.

FIG. 9 shows another implementation of the invention. A downhole tool 100 is equipped with an enclosure 200 of the invention housing a series or bank of aligned transducers 210. With this configuration, the transducers 210 can be activated in a timed or phased sequence for targeted and controlled measurements. For example, by timing their activation, the 'angle' of the transducers 210 can be varied electrically in such a way that signal beam/energy can be transmitted/received at the normal or at oblique incidence with reference to the borehole wall. Other implementations can be configured to achieve such phased array measurements (not shown). The timing and activation of the transducers 210 can be controlled by conventional software means and electronics on the electronic board 230.

Figure 10:
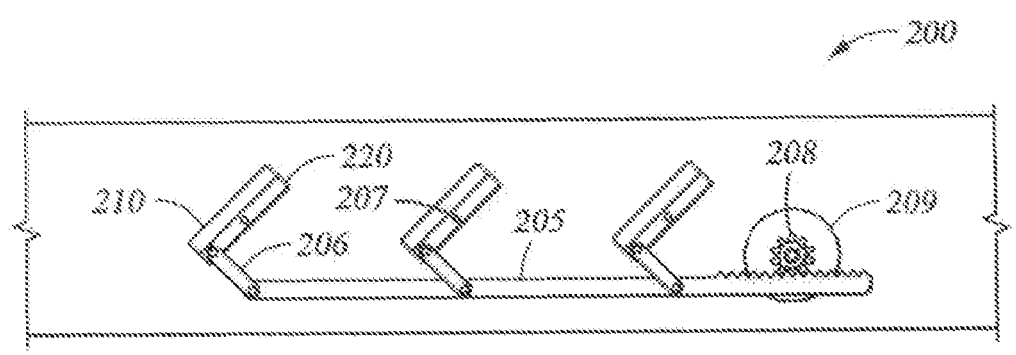
FIG. 10 is a side view of an enclosure equipped with mechanically rotateable transducers in accord with the invention.

FIG. 10 shows a side view of another enclosure 200 implementation of the invention. In this configuration, the backing elements 220 are linked to an actuator rod 205 via individual hinged connecting rods 206. The backing elements 220 are each mounted on individual axles 207 that allow the backing elements to pivot and rotate about a fixed axis such that the affixed transducer elements 210 can rotate in either direction. The actuator rod 205 includes a gear rack at one end to engage with a pinion gear 208 on a motor 209 mounted within the enclosure 200, forming a rack-and-pinion gear system. The motor 209 can be activated to rotate in either direction to move the actuator rod 205, which in turn pulls or pushes the connecting rods 206 to rotate the transducer elements 210 such that the element faces are positioned at a desired angle for targeted measurements. The motor 209 can be linked through the electronic board 230 for activation and control. It will be appreciated by those skilled in the art that various mechanical configurations as known in the art can be used to alter the position or angles of the transducers as desired in other enclosure implementations of the invention.

The technologies described herein may be implemented in various fields of use. They are not limited to subsurface applications. The application for acoustic transducers is just an example of the potential uses for this invention. The technologies described herein may be used to package all types of transducer devices, which can then be interfaced with power, control, or recording systems external to the enclosure 200. It will also be appreciated that the transducers are not limited to operation within any specific frequency or frequency range. Various geometries described herein merely represent a small sample of the many potential applications and designs that are covered by implementations of various technologies described herein. For example, enclosures of the invention may be configured in various shapes other than rectangular unit (not shown). It will also be appreciated that the various technologies described herein may be implemented in any type of downhole tool or application, such as wireline, LWD/MWD, coiled tubing, casing tubulars, logging-while-tripping, logging-while-casing, reservoir monitoring, etc.

What is claimed is:

1. A downhole tool for subsurface disposal, comprising:
    an elongated tool body;
    an enclosure attached to an exterior surface of the tool body;
    the enclosure comprising:
        at least one transducer rotatably disposed at an angle with respect to a longitudinal axis of the enclosure; and
        an electronics board coupled to and disposed adjacent to the at least one transducer;
        wherein the enclosure defines an internal cavity, and the internal cavity contains a fluid for insulating the at least one transducer from a downhole environment, and further wherein the fluid is in direct contact with the at least one transducer and the electronics board.

2. The downhole tool of claim 1, wherein the angle ranges from about 1 degree to about 90 degrees.

3. The downhole tool of claim 1, wherein the enclosure comprises a plurality of transducers.

4. The downhole tool of claim 3, wherein each transducer of the plurality of transducers is disposed at an angle with respect to the longitudinal axis of the enclosure.

5. The downhole tool of claim 4, wherein all transducers are disposed at the same angle with respect to the longitudinal axis of the enclosure.

6. The downhole tool of claim 3, wherein the transducers are configured to receive or transmit a signal at varied angles with respect to the longitudinal axis of the enclosure.

7. The downhole tool of claim 1, wherein each at least one transducer is an acoustic transducer.

8. The downhole tool of claim 1, wherein the enclosure comprises a rectangular unit having a lid on one surface.

9. The downhole tool of claim 1, further comprising a connector for linking the electronics board to external circuitry.

10. The downhole tool of claim 1, wherein each at least one transducer can be selectively activated to function as a receiver or transmitter.

11. The downhole tool of claim 1, wherein the at least one transducer is configured for selective rotation within the enclosure.

12. The downhole tool of claim 1, wherein the enclosure comprises a lid disposed on a surface thereof, the lid being able to compensate for a volume change associated with the fluid within the enclosure.

13. The downhole tool of claim 1, wherein the fluid is a liquid.

14. The downhole tool of claim 1, wherein the electronics board interfaces with a telemetry module for transmitting measurement information to the surface.

15. A method for packaging a transducer for subsurface disposal, comprising:
    attaching an enclosure to an exterior surface of an elongated body of a downhole tool, wherein the enclosure defines an internal cavity;
    rotatably disposing the transducer within the enclosure at an angle with respect to a longitudinal axis of the enclosure;
    disposing an electronics board within the enclosure adjacent to the transducer;
    coupling the electronics board to the transducer; and
    filling the internal cavity of the enclosure with a fluid to surround the transducer so that the fluid is in direct contact with and insulates the at least one transducer from a downhole environment.

16. The method of claim 15, further comprising disposing a plurality of transducers within the enclosure, each transducer disposed at an angle with respect to the longitudinal axis of the enclosure.

17. The method of claim 16, wherein all transducers are disposed at the same angle with respect to the longitudinal axis of the enclosure.

18. The method of claim 15, further comprising linking the transducer for rotation within the enclosure.

19. The method of claim 15, wherein each at least one transducer can be selectively activated to function as a receiver or transmitter.

20. The method of claim 15, wherein the transducers are configured to receive or transmit a signal at varied angles with respect to the longitudinal axis of the enclosure.

21. The method of claim 15, further comprising interfacing the electronics board with a telemetry module for transmitting measurement information to the surface.

* * * * *